United States Patent Office 3,790,643
Patented Feb. 5, 1974

3,790,643
HEXAHYDRO-o-XYLYLENE COMPOUNDS AND
PROCESS FOR THEIR PRODUCTION
Donald J. Anderson, San Anselmo, Calif., assignor to Chevron Research Company, San Francisco, Calif.
No Drawing. Continuation of application Ser. No. 621,792, Mar. 9, 1967, which is a continuation-in-part of application Ser. No. 258,632, Feb. 14, 1963, both now abandoned. This application May 19, 1972, Ser. No. 255,035
Int. Cl. C07c 17/28, 23/00
U.S. Cl. 260—648 R    4 Claims

ABSTRACT OF THE DISCLOSURE

Hexahydro-o-xylylene compounds are produced under free radical catalysts in a 1 to 1 addition of 1,7-octadiene with carbon compounds having a chain transfer constant (100° C. and 1-octene) in the range 0.05 to 10. The reaction is carried out in the liquid phase at a temperature in the range 0° C. to 200° C.

CROSS REFERENCES

This is a continuation of application Ser. No. 621,792, filed Mar. 9, 1967 and now abandoned which in turn is a continuation-in-part of application Ser. No. 258,632, filed Feb. 14, 1963 and now abandoned.

This invention is a novel process for the production of hexahydro-o-xylylene compounds. More particularly, it is concerned with a free radical catalyzed 1.1 reaction of 1,7-octadiene with an organic compound having a standard chain transfer constant in the range from about 0.05 to 10, preferably in the range from about 0.05 to 5. Using chloroform as a typical small molecule addend compound, the main reaction sequence may be represented as follows:

(1)     $ROOR \longrightarrow 2RO \cdot$
(2)     $RO \cdot + HCCl_3 \longrightarrow ROH + \cdot CCl_3$ (initiation)
(3)

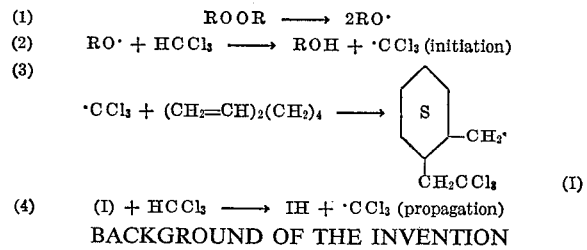

(4)     $(I) + HCCl_3 \longrightarrow IH + \cdot CCl_3$ (propagation)

BACKGROUND OF THE INVENTION

This invention pertains to the synthesis of small organic molecules effected by free radical catalysts.

The production of small molecules under the influence of free radicals in solution in a 1 to 1 addition reaction of 1-alkenes with small organic compounds is well known in the art. A leading reference and collection of this art is "Free Radicals in Solution" by Cheves Walling, Library of Congress Catalogue Card No. 57–10818, chapter 6.

Similar addition reactions involving some α,ω-alkadienes are also known in the art, and these in general are concerned with the addition of two small organic molecules to the diene or of a single adduct molecule to one of the diene carbon-carbon double bonds leaving the second double bond unchanged. This invention involves a novel 1 to 1 free radical addition to 1,7-octadiene of a single small molecule in a 1–4-type addition reaction which is accompanied by an intramolecular 2–7 cyclization step yielding the subject alicyclic saturated compounds. This latter reaction is not known in the art.

By the novel process of the present invention, a new route to known and useful compounds is made available to the art. New and useful compounds are also made available to the art. The foregoing compounds are in general useful per se as organic solvents. In general they can be readily converted to the corresponding known and useful ortho substituted benzenes by dehydrogenation using conventional means, i.e., noble metal catalysts, sulfur and the like. Many of the compounds produced in the subject process are useful as intermediates for the production of pharmaceuticals, esters, organic polyesters, insecticides and the like. For example, the novel compounds 1-chloromethyl, 2-(β,β,β-trichloroethyl)-cyclohexane and α-(2-chloromethylcyclohexyl)-acetic acid can be readily converted by hydrolysis to the corresponding lactone. This lactone is useful for the production of yohimbine and yohimbane-type alkaloids (cf. (1) G. Stark and R. K. Hill, JACS, 76, 949; and (2) E. van Tarmelen and M. Sharma, JACS, 76, 950). This lactone is also useful for the production of the corresponding linear polyester. Other uses will be readily apparent to the art.

It has now been found that substituted hexahydro-o-xylylene compounds can be prepared in a catalyzed liquid phase 1 to 1 addition reaction of an organic compound to 1,7-octadiene. In the reaction under free radical catalysis a mixture of the diene and addend compound in the mol ratio of about 1 to 1–100, respectively, is heated to a temperature in the range 0° C. to 200° C. and at a pressure sufficient to maintain the liquid phase. Depending upon the particular addend compound, reaction times can vary from about 0.1 to 200 hours. Suitable addend compounds contain from 1 to about 25 carbon atoms and at least one of the elements of the group hydrogen, oxygen, nitrogen, fluorine, chlorine, bromine and iodine, *provided* that the addend compound has a chain transfer constant as measured in 1-octene at 100° C. in the range from about 0.05 to 10. Surprisingly, when the addend compound has a constant in the above range, the reaction chain sequence is able to accommodate an intramolecular cyclization step, and the resulting product is mainly the corresponding substituted hexahydro-o-xylylene.

The reaction is a displacement on a univalent atom, more particularly on hydrogen or halogen, and involves alternate free radical displacement and addition reactions, as distinguished from ionic reactions of the Friedel-Crafts or acid catalyzed reaction types. A unique aspect of the reaction of the present process is an intervening cyclization giving rise to the novel cyclic hexahydro-o-xylylene derivatives of the present process in what may be described as a pseudo 1,4-addition of free radicals. A further illustration of the reaction is as follows:

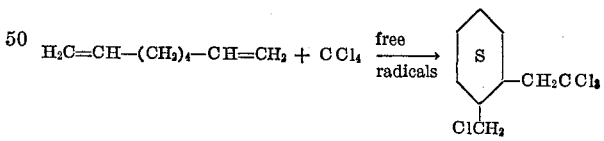

In order to accomodate the internal cyclization step, the organic free radical addend molecule must have a chain transfer constant in the range 0.05 to 10, as measured in 1-octene at 100° C. in the presence of a radical initiator. Organic free radical addend molecules having chain transfer constants below about 0.05 yield little or none of the desired cyclic hexahydro-o-xylylene deriavtive. Addend molecules having chain transfer constants above about 10, on the other hand, lend themselves so readily to chain transfer that the necessary intramolecular cyclization step is precluded.

By chain transfer constant is meant the free radical kinetic parameter which is the ratio, in a monomer-addend free-radical reaction system, of the radical displacement reaction constant ($k_{tr}$) to the monomer polymerization chain propagation constant ($k_p$) (see for example, "Free Radicals in Solution" by Cheves Walling, John Wiley & Sons, Inc., New York (1957), p. 150).

By standard free radical chain transfer constant for a given addend is meant the chain transfer constant of that addend compound as measured in 1-octene solution at 100° C. under free radical initiation. (See Walling, ibid. at p. 286, for example.)

Organic compounds containing from 1 to 25 carbon atoms and at least one of the elements in the group hydrogen, oxygen, nitrogen, fluorine, chlorine, bromine and iodine are contemplated as added compounds in the instant process provided that the compound has a standard 1-octene chain transfer constant as noted above.

In general, suitable organic addend compounds have at least one peripherally covalent bonded univalent atom capable of the free radical displacement reaction. At least one such peripheral atom is required in order that the addend compound exhibit a chain transfer constant. Usually, the atom is hydrogen or halogen, and particularly, halogen having an atomic number greater than 9 and less than 54.

In general the displacement as between hydrogen and halogen or two different halogens occurs on the atom lowest on the electronegativity scale (cf. Nature of the Chemical Bond, Linus Pauling, Cornell University Press (1945), p. 65), and the order from lowest electronegativity up is H, I, Br, and Cl.

Organic addend compounds containing interfering substituents do not exhibit chain transfer constants in the required range. They exhibit values approximately above 10.

Suitable organic addend compounds in addition to having the required chain transfer constants must yield solutions when mixed with octadiene under reaction conditions.

Including among the types of suitable addend compounds are polyhaloalkanes, arylpolyhaloalkanes, alkanals, arylalkanals, 1°+2° alkanols, 1°+2° arylalkanols, alkylamines, arylalkylamines, alkanoic acids, arylalkanoic acids, the corresponding α-halogenoalkylcarboxylic acids, as well as the acylhalides, anhydrides, lower alkyl esters, and amides of the indicated carboxylic acids, 2-halogenoalkanenitriles, alkyl ethers, arylalkyl ethers, e.g., cyclic and acylic compounds as defined above.

In general, so far as results in terms of yields of the desired cyclic hexahydro-o-xylylene derivatives are concerned, increased molecular weight of the addend favors higher yields. Thus, the use of an addend compound having six carbon atoms per molecule tends, under analogous conditions, to produce a better yield of the desired derivative than the corresponding lower molecular analogous compound. The availability, in general, of addend compounds having less than about 25 carbon atoms per molecule makes them preferred feeds.

Representative alkanoic acids and related compounds include acetic acid, lauric acid, acetic anhydride, chloroacetic acid, dichloroacetic acid, trichloroaetic acid, methyl chloroacetate, ethyldichloromalonate, iodoacetic acid, ethyl - α-bromoisobutyrate, methyl α-bromo-n-butyrate, N,N-dimethyl formamide, propionamide, n-C$_6$H$_{13}$CONH$_2$, butyramide, stearamide, acetyl chloride, n-octanoyl bromide, lauroyl chloride, caproyl bromide, α-chloroacetic acid, and the like (cf. U.S. 2,423,497 and 2,577,422).

Representative ether-like compounds, such as alkylethers, arylalkylethers, etc. include diethylether, dibutylether, tetrahydrofuran, dicyclohexylether, α-chlorodiethylether, dioxane, 1,3-dioxolane, sym-dimethoxyethane, 2-methyl - 2-chloro-methyl-1,3-dioxolane, acetal, methylal, dimethylformal, methyl and ethyl orthoformate esters, and the like (cf. U.S. 2,433,844).

Representative amines include piperidine, n-butylamine, i-butylamine, stearylamine, cyclohexylamine, n-heptylamine, and the like (cf. Urrey et al., JACS, 74, 6155 (1952)).

Representative polyhaloalkanes includue CCl$_4$, CBr$_4$, CI$_4$, CHCl$_3$, CHBr$_3$, CHI$_3$, BrCCl$_3$, ICCl$_3$, ICF$_3$, ICCl$_3$, BrClFC-CBrF$_2$, IClFC-CClF$_2$, IF$_2$C-CF$_2$-CF$_3$, BrCH$_2$-CCl$_3$ ICH$_2$-CCl$_3$, BrCHCl$_2$, BrCCl$_2$, as well as DDT-(insecticide)-like haloalkanes, such as 1,1,1-trichloro-2,2-bis(p-chlorophenyl)ethane,
1,1,1-trichloro-2,2-bis(p-fluorophenyl)ethane,
1,1,1-trichloro-2,2-bis(p-methoxyphenyl)ethane,
1,1,1-trichloro-2,2-bis(p-bromophenyl)ethane,
1,1,1-trichloro-2,2-bis(3,6-dibromophenyl)ethane,
1,1,1-trichloro-2,2-bis(p-methylphenyl)ethane,
1,1,1-trichloro-2,2-bis(3-methyl-4-chlorophenyl)ethane,
1,1,1-trichloro-2,2-bis-(2-methyl-4,5-dichlorophenyl) ethane, and the like (cf. U.S. 2,609,402; 2,568,859; M. S. Kharusch et al., JACS, 69, pp. 1100–1110).

Representative alkanal and arylalkanals include such aldehyde compounds as formaldehyde, acetaldehyde, n-butyraldehyde, n-heptaldehyde, iso-butyraldehyde, benzaldehyde, β-methoxypropionaldehyde, propionaldehyde, glutaraldehyde, β-phenylisobutyraldehyde, and the like (cf. U.S. 2,517,684; 2,517,685; 2,517,732; 2,533,944; 2,577,133; 2,621,212; and 2,650,253).

Representative alkanol and arylalkanols include isopropanol, i-butanol, s-butanol, cyclohexanol, n-dodecanol, β-phenylethanol, n-octanol, β-(α-naphthyl)-ethanol, and the like (cf. U.S. 2,559,628; W. H. Urrey et al., JACS, 75, 250 (1954); W. H. Urrey et al., ibid., 76, 450 (1954)).

Representative 2 - halogenoalkanenitriles include 2-chloropropanenitrile, 2 - chloroethanenitrile, 2-chloro-n-butanenitrile, 2-chloro-n-heptanenitrile, 2-bromoethanenitrile, 2 - chloro-n-undecanenitrile, 2-bromo-n-eicosanenitrile, 2 - chloro, 3-phenylpropanenitrile, 2-bromo,3-(α-naphthyl)-propanenitrile, 2-chloro, 2-phenylethanenitrile, 2-chlorobutanedinitrile, 2-chlorohexanedinitrile, 2-chloro, 2-ethylhexanenitrile, 2-chloro, 3-methylbutenitrile, and the like (cf. U.S. 2,615,915).

An important aspect of the addend compounds is, as noted above, that they have a chain transfer constant in the range 0.05 to 10 as measured in 1-octane at 100° C. and that they be present in the liquid phase under reaction conditions. Radical displacements in the present process wherein the displacement is on halogen are a particularly preferred class of addend compounds for the reason that the resulting product in general will be a cyclic hexahydro-o-xylylene derivative having two different functional groupings attached, and in which the order of functionality varies to a sufficient degree, such that the functional groups may be operated upon in a synthetic chemical sense in separate steps.

Representative products obtained by the use of some of the above illustrative compounds as addends in the present process include 1-chloromethyl, 2-(β,β,β-trichloroethyl)-cyclohexane, methyl α-(2-methylcyclohexyl)-acetate, methyl (2-chloromethylcyclohexyl)-methyl ketone, (2 - chloromethylcyclohexyl) - acetonitrile, 1,1,2-trifluoro, 3 - (2 - bromomethylcyclohexyl) - propane, 1-phenyl, 3-(2-methylcyclohexanyl), 2-propanol, 2-(2-bromomethylhexahydrobenzyl), 3-phenyl-propanenitrile, 3-(2-chloromethylcyclohexyl)-propanenitrile.

In the present process after the free radical displacement on a hydrogen or halogen atom occurs, with respect to the addend compound, there is a free radical remainder, e.g., such as ·CCl$_3$. Other representative remainders are ·CO$_2$CH$_3$, ·CH$_2$CO$_2$H, ·CH(CO$_2$CH$_3$)$_2$,
·CH$_2$CO(O$_2$CH$_2$CH$_3$), ·CH(NH$_2$)CH$_2$CH$_2$CH$_3$,
·CH(OCH$_3$)$_2$, ·C≡N, ·CHCl$_2$, ·CBr=CF$_2$,
·CHClCO$_2$H, ·CCl$_2$CO$_2$H, ·CH(CH$_2$C$_6$H$_5$)(CO$_2$H),
·CCl$_2$COOCH$_3$, ·CBr$_2$CO$_2$CH$_3$, ·C(CH$_3$)$_2$(CO$_2$C$_2$H$_5$),
·CON(CH$_3$)$_2$, ·CH(CH$_3$)(CONH$_2$), ·COCH$_3$,
·CO[(CH$_2$)$_7$CH$_3$], ·CH(CH$_3$)-O-C$_2$H$_5$,
·CH(C$_2$H$_5$)-O-C$_3$H$_7$, α-furanyl radical, dioxanyl radical,

•C(OH₃)₃, •C(OCH₃)₂[(CH₂)₅CH₃]
α-piperidyl radical,

•CH(NH₂)[(CH₂)₅CH₃], •CH[N(CH₃)₂]CH₃,
•C(CH₃)(C₅H₁₁)(NHC₂H₅), •CBr=CF₂, •CClBrF₂,
•CH₂CCl₃, •CHCl₂, •CBrCl₂, •Cl,
•C(CCl₃)(p-chlorophenyl)₂,
•C(CCl₃)(p-methylphenyl)₂,
•C(CCl₃)(3-methyl-4-chlorophenyl)₂,
•CH(CN)(n-hexyl), •C(CN)(1-phenyl-n-butyl)(CH₃),
•CO(n-hexyl), •CO(i-pentyl), •CO(n-decyl),
•CH(OH)(n-hexyl), •CH(OH)(n-butyl),
•C(OH)(CH₃)₂, •CH(OH)(n-undecyl),
•CH(OH)(stearyl), •CH(OH)(benzyl),
•CH(OH)(α-naphthyl), and the like. These remainders add to the intermediate hexahydro-o-xylylene radical or to 1,7-octadiene in the first stage of the reaction and become a part of the final product.

By radical initiator is meant any means of inducing the formation of free radicals in the liquid phase in the temperature range 0–200° C., including homolytic thermal cleavage of a covalent bond of soluble organic and inorganic peroxidic compounds, free radical generation by physical means, such as photochemical cleavage of such covalent bonds, oxidation-reduction reactions, i.e., by 1-electron reductions either accomplished electrochemically or chemically in an organic redox system, and high energy bombardment of the reaction medium as by alpha, beta, and gamma rays. Representative organic peroxidic compounds are t-butylperoxide, benzoyl peroxide, peroxyacetic acid, lauroylperoxide, t-butylperbenzoate, cumene hydroperoxide, cyclohexylhydroperoxide, 2 - azobisisobutyronitrile, that is, aliphatic hydroperoxides, aralkyl hydroperoxides, aliphatic and aromatic peroxy acids, diacyl peroxides, diaroyl peroxides, and the like (see, for example, Appendix I, "Organic Peroxides" by A. V. Tobolsky and R. B. Mesrobian, Interscience Publishers, Inc., New York, 1954, p. 157, as well as Kirk-Othmer, Encyclopedia of Chemical Technology, vol. 10 (1953), p. 58 et seq.).

In a preferred operation carrying out the reaction of the present process, a solution of 1.7-octadiene in the organic addend compound together with added peroxidic organic free radical initiator is heated to a temperature at which the catalyst homolytically dissociates, liberating the reaction-inducing catalyst radicals. Depending upon the nature of the addend compound and the dissociation temperature, atmospheric or superatmospheric pressures may be employed in order to maintain the liquid solution. Subatmospheric pressures may also be employed, for example, where the addend is fairly high boiling and a lower reflux temperature is desired for temperature control. Reaction temperatures below about 0° C. are not desirable because solution viscosities are relatively high, reaction rates are generally slower, and operable peroxidic catalysts dangerous to handle. While light (h nu) and free radical initiators such as gamma-rays and the like are temperature independent, their use at ambient temperatures is more economical. Few peroxidic free radical initiators having dissociation temperatures above about 200° C. are known. Therefore, reaction temperatures above 200° C. are not advantageous. Moreover, it appears that the intramolecular cyclization step, which is an important aspect of the present invention, is favored by milder reaction temperatures. Thus, a preferred temperature range is one from about 20° C. to 150° C.

Reaction times will vary depending upon the particular combination of addend and radical initiator employed. In general, reaction times are shorter for addends having the high operable chain transfer constants. Conversely, for addends having chain transfer constants (measured in 1-octene at 100° C.) of the order of 0.05, reaction times are long and initiator requirements may be as much as one mol per mol of addend. In such event, initiator additions to the reaction zone are desirably made incrementally over the reaction period. Minimal initiator requirements may be as low as 0.001 mol per mol of 1,7-octadiene.

In general, relatively large amounts of the organic addend compound relative to octadiene are desirably used. Particularly desirable mol ratios are in the range from about 1–100 mols of addend per mol of the diene. Higher mol ratios may be used, but their use entails the added burden of product separation from unconsumed addend compound. Another disadvantage is the less efficient use of the reaction zone. Preferred mol ratios are in the range from 1–50.

The following examples will further amplify and illustrate this invention.

EXAMPLE 1

1,7-octadiene (1.0 mol; 110.0 grams), 10 mols carbontetrachloride (1540 grams), and 4.8 grams of benzoylperoxide (0.02 mol) were mixed and heated at the reflux temperature (approximately 80° C.) for a period of about 111 hours. During the reaction period, four additional 4.8 gram aliquots of the peroxide catalyst were added to the reaction mixture. The crude reaction product, 1,721 grams of a light-yellow liquid, was topped by fractional distillation, taking overhead as distillate the carbontetrachloride, and light ends up to a head temperature of 78° C., leaving 391 grams of bottoms, a brown viscous liquid, as the crude reaction product. This mixture was chromatographed on a silica gel column, yielding 106.8 grams of crude 1-chloromethyl, 2-(β,β,β-trichloroethyl)cyclohexane. This compound was found to have a boiling point range 73–74° C. at 0.06 mm. of mercury pressure, an $n_D^{20}$ —1.5175, and the following elemental analysis:

Calculated (percent): Carbon, 40.94; hydrogen, 5.34; chlorine, 53.71. Found (percent): Carbon, 41.13; hydrogen, 5.36; chlorine, 53.60.

The 60 Mc. nuclear magnetic resonance spectrum for this compound showed characteristic absorption at 6.3, 7.2, and 8.3 tau. The calculated and found areas under the spectral curve were in complete agreement, i.e., 1, 1, and 5 realtive areas for the respective spectra values above.

A portion of the cyclic derivative, 13.2 grams (0.05 mol) was added to concentrated sulfuric acid, 10 ml., and stirred at 75° C. for about four hours. The mixture was then cooled and poured onto 500 grams of cracked ice. The resulting mixture was extracted with diethyl ether. The resulting ether solution was washed with water and dried over sodium sulfate. Upon the removal of the solvent by evaporation, there remained 6.7 grams of an oil which, on the basis of the characteristic infrared and nuclear magnetic resonance spectra, was the novel cyclic compound α-(2-chloromethylcyclohexyl)-acetic acid, having the following characteristics infrared and NMR spectra bands:

Infrared spectra

| | Peak |
|---|---|
| 1,710 cm.⁻¹ | Acid carbonyl. |
| 3,000–3,500 cm.⁻¹ | Broad acid-OH. |

Nuclear magnetic resonance spectra

| Hydrogen Type | COOH | CH²Cl | CH²CO²H | Ring H |
|---|---|---|---|---|
| Chem. shift (tau-) | −1.93 | 6.4 | 7.6 | 8.5 |
| Area, calculated | 1.00 | 2.0 | 2.0 | 10.0 |
| Area, found | 1.00 | 2.0 | 2.0 | 10.0 |

A portion of the above chloroacid, 13.2 grams (0.05 mol) was dissolved in 25 ml. of chloroform and treated with 0.5 N sodium hydroxide at room temperature for 16 hours. The expected lactone of 1 - carboxymethyl-2-hydroxy-methyl cyclohexane was recovered and identified by the characteristic NMR and infrared spectra (cf. JACS, 76 949–950 (154)). This lactone is used in the production of the useful yohimbane-type alkaloids (see U.S. 3,119,827).

EXAMPLE 2

A solution of 1,7-octadiene (110.0 g., 1.0 mol) and benzoyl peroxide (4.8 g., 0.02 mol) in chloroform (1434 g., 12.0 mols) was refluxed under a pressure of 37.5 cm. mercury. The pot temperature was initially 77° C. Refluxing was continued three days with the addition of a further 4.8 g. benzoyl peroxide each day—total peroxide added, 19.2 g. The reaction was followed by infrared analysis using the disappearance of the olefinic band and the appearance of the C-CH$_3$ band.

The reaction mixture was stripped of unreacted chloroform to leave an orange-colored oil, 164.30 g. This oil was separated into components by chromatography over silica gel. There was isolated methyl-2($\beta,\beta,\beta$-trichloroethyl)-cyclohexane, 62.7 g. The infrared spectrum shows characteristic C-methyl absorption (1375 cm.$^{-1}$) and trichloromethyl absorption (700–800 cm.$^{-1}$). The NMR spectrum is characteristic of the C$\underline{H}_2$CCl$_3$ and C-C$\underline{H}_3$ groups and displays the correct relative areas.

EXAMPLES 3–5

Under essentially comparable conditions, acetonitrile, hydrogen bromide and hydrogen sulfide were also reacted with 1,7-octadiene. A compilation of the results of these and the previous examples are listed in the following table:

| Reactant | Chain transfer constant | Corresponding hexahydro-o-xylylene yield |
|---|---|---|
| CH$_3$CN | ~0.01 | None to trace. |
| CCl$_4$ | ~0.7 | Excellent. |
| HCCl$_3$ | ~0.8 | Do. |
| HBr | (¹) | None. |
| H$_2$S | (¹) | Do. |

¹ Very high (>>10).

As the range of embodiments of this invention is wide, and many may appear to be widely different, yet not depart from the spirit and scope thereof, it is to be understood that this invention is not limited to the specific embodiments thereof, except as defined in the appended claims.

What is claimed is:
1. The process for the production of a cyclic hexahydro-o-xylylene compound of the formula

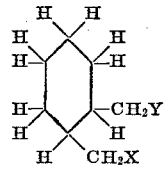

which comprises reacting in the liquid phase with the aid of a free radical initiator 1.7-octadiene with an organic free radical polyhaloalkane addend compound of the formula XY at a temperature in the range from about 0° C. to 200° C.; wherein said addend compound has a carbon atom content in the range 1 to 25, is dissociable into free radicals X and Y, has at least one peripherally covalent bonded atom X capable of free radical displacement, said X being selected from the group consisting of hydrogen and halogen, and said addend compound having a chain transfer constant as measured in 1-octene at 100° C. in the range from about 0.05 to 10, and yielding solutions when mixed with said octadiene under the reaction conditions.

2. The process as in claim 1 further characterized in that the temperature is in the range from about 20° C. to 150° C.

3. The process as in claim 1 further characterized in that said initiator is an organic free radical initiator.

4. The process as in claim 1 further characterized in that for each mol of the diene from about 1 to 50 mols of the added compound is present in the reaction system.

References Cited

UNITED STATES PATENTS 3,631,115  12/1971  Nakayawa et al. __ 260—648 R

FOREIGN PATENTS 1,033,694  6/1946  Great Britain _____ 260—648 R

HOWARD T. MARS, Primary Examiner

U.S. Cl. X.R.

260—340.7, 340.9, 464, 465 C, 468 R, 514 R, 515 R, 544 R, 546, 557 R, 570.54, 563 R, 586 R, 611 R, 611 A, 613 R, 617 R, 618 R, 598, 648 F, 999